Oct. 18, 1966  G. D. LEWIS ETAL  3,279,185
ROCKET STEERING SYSTEM
Filed July 18, 1963

INVENTORS
GEORGE D. LEWIS
BURTON A. JONES

BY Claude Funkhouser
ATTORNEY 3,279,185
ROCKET STEERING SYSTEM
George D. Lewis and Burton A. Jones, North Palm Beach, Fla., assignors, by mesne assignments, to the United States of America as represented by the Secretary of the Navy
Filed July 18, 1963, Ser. No. 296,142
6 Claims. (Cl. 60—231)

The present invention relates generally to an improved system to effect the guidance of a missile. More particularly, the invention relates to a new and improved system to change the direction of the thrust vector of a rocket motor.

The nature of modern aerospace technology has led to a constant search for systems, apparatus and components which can accomplish the function of known apparatus, systems, and components but which are of less weight. The reduction of weight is a constant goal in the development of modern aerospace vehicles. One of the areas in which the weight reduction for a missile has been found possible is in the guidance system, and more particularly in the thrust vector control system of the missile jet propulsion system.

At present, there are various mechanical means being utilized to affect the thrust vector, line of thrust, of rocket motors utilized to propel modern missiles. Carbon vanes are the oldest of such devices and were employed in the jet exhaust of early rocket motors to deflect the exhaust and thereby give direction to the rocket. Later refinements universally or pivotally mounted the rocket motor thrust chamber to the missile airframe to enable the chamber to be pivoted and thereby change the line of thrust which causes a change in direction of the missile. This universally or pivotally mounted system is known as gimbaling of the engine. The gimbaling of the rocket engine to change the thrust vector to thereby guide the missile is most often accomplished by using hydraulic actuators which are in turn controlled by electrical apparatus. These hydraulic actuators and their associated components weigh a considerable amount. Other common means utilized to guide the missile have been smaller rocket motors which provide enough thrust to effect the steering of the missile. A small rocket engine type steering system also weighs a considerable amount.

The desire to reduce the weight of all necessary components in a missile system has resulted in an effective system of reduced weight which can be utilized to displace the thrust vector which the rocket engine imparts to the missile airframe.

It is therefore the general purpose of this invention to provide a means to control the thrust of a rocket engine which embraces all of the advantages of the similarly employed prior art devices and possesses none of the aforedescribed disadvantages. To attain this desired performance, the present invention contemplates a unique arrangement of components so as to provide a rocket motor thrust control system which is of minimum weight, which is simple, and which is effective to accomplish the desired control.

Accordingly, it is an object of the present invention to provide a jet propulsion powerplant thrust deflecting arrangement comprising a minimum number of moving parts and which is of minimal weight.

Another object of the present invention is to provide an apparatus comprised of a minimum number of moving parts and which is exceptionally rugged, economical to manufacture, and which will provide effective thrust control of a jet propulsion device.

Other objects and many of the attendant advantages of this invention will be readily appreciated as the same becomes better understood by reference to the following detailed description when considered in connection with the accompanying drawings wherein.

Figure 1:
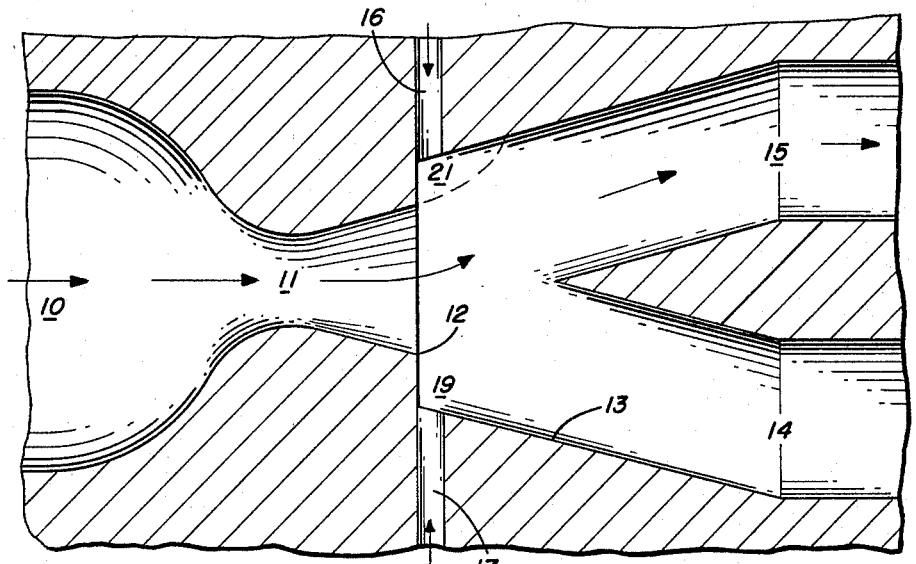
FIG. 1 is a cross-sectional view of a fluid amplifier of the general character known in the prior art.

Referring now to FIG. 1 wherein is disclosed the fluid control device known in the prior art as a fluid amplifier and which has been quite widely publicized in the literature and is disclosed in at least one pending patent application. One of the original fluid amplifiers of this type is fully disclosed in a patent application of Billy M. Horton, Serial No. 51,896, now Patent No. 3,122,165, which was filed on September 19, 1960. The fluid amplifier of FIG. 1 directs a fluid flow into one of two passages and the flow once directed in one of the passages will remain locked on that flow path due to a pressure differential across the fluid flow.

Fluid under pressure passes through conduit 10, nozzle 11, and then passes through either passage 14 or passage 15. The passage through which the fluid exiting from nozzle 11 passes depends upon the direction imparted thereto by a secondary control fluid admitted through either passage 16 or 17. If the flow is passing through channel 10, through nozzle 11, and out through channel 14, it will remain in this flow path provided no secondary fluid is subjected to the main flow through passage 17. As is noted in FIG. 1, the passages 16 and 17, respectively, are disposed at a point in the exit of the nozzle 11 where the side wall has a relief or step as is shown at 12. This recess at 12 provides a sharp increase in the cross-sectional area of the flow path of the nozzle exit of nozzle 11. Due to this relief 12 the flow from nozzle 11 to channel 14 leaves the wall at 12 and does not recontact the wall until it approaches a point approximately at 13. The flow in passage 14 will remain there because there is a decrease in pressure caused by the fluid flow as it leaves the wall at point 12 due to the recess. This causes a pressure differential between the low pressure area 19 and the opposite side of the flow which is subjected to the ambient pressure existing in channel 15. In order to force the flow of fluid from channel 14 to 15, a small amount of fluid is injected through passage 17 which destroys the reduced pressure in the low pressure area 19 and will force the fluid flow from passage 14 to passage 15. As soon as the flow has changed to passage 15 a low pressure area is established at 21 in the same manner as it was established in area 19 and the flow in passage 15 will remain locked on passage 15 until disturbed by an injection of fluid through passage 16.

The fluid amplifier as shown in FIG. 1 has proven to be quite meritorious in the various systems to which it has been applied. It has not, however, proven to be an entirely satisfactory device when applied to the thrust vector control problem in the jet propulsion systems of aerospace vehicles. As aforementioned, the fluid amplifier of FIG. 1 is a lock on type device of a character in which the establishment of fluid flow in either of the respective legs 14 and 15 of the Y will cause the fluid flow to remain in that leg until disturbed by a secondary fluid pressure. An essential factor for the operation of this type device is the creation and maintenance of a back pressure in the leg in which there is no flow of fluid. In attempts to utilize this type of fluid amplifier in space applications where the ambient pressure is very low or zero, it has been found that no significant back pressure exists to hold the fluid flow in the opposite leg. Consequently, it was found that this prior type device would not operate under such conditions, presumably because of the lack of differential pressure across the flow in one leg.

Figure 2:
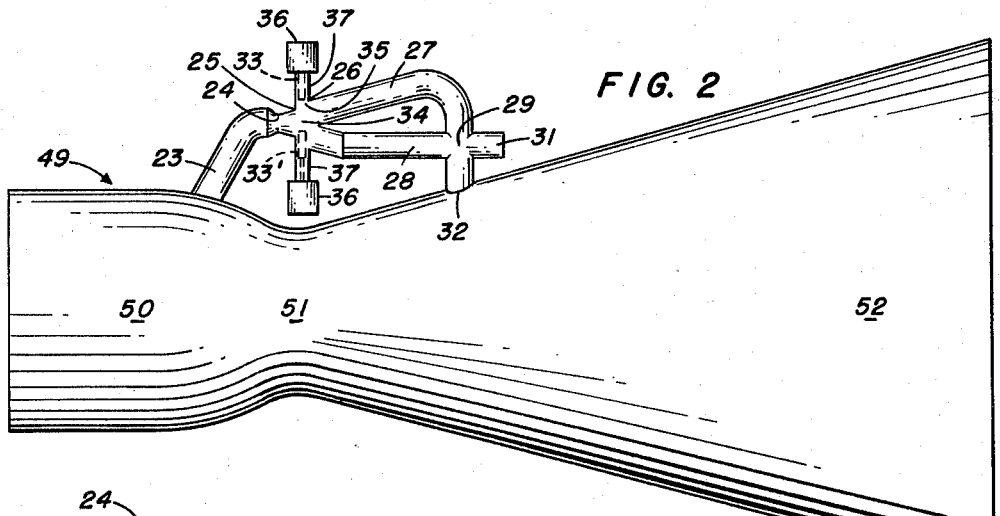
FIG. 2 is an elevational view of an embodiment of the present invention.

In order to alleviate this problem of the prior art fluid amplifiers and to make a satisfactory and completely workable device, the present invention incorporates a configuration in which one of the legs of the Y passage is so disposed that it intersects the other leg. Thus, when the fluid is flowing in either leg, the static pressure of the fluid flow as it passes through the intersection will be passed through the opposite leg and back to the junction of the Y in a manner to establish a back pressure which will hold the fluid flow in the selected leg. As is illustrated in FIG. 2, the fluid flow passes through nozzle 24 and through passage 27 where it is subjected to a change in direction and caused to cross the passage 28 at intersection 29. The static pressure of this fluid flow as it intersects passage 28 at intersection 29 is transmitted by channel 28 back to the junction 34 of passage 27 and passage 28 to establish a back pressure in 28 which furnishes a differential pressure between the low pressure area 35 and the pressure in channel 28.

More specifically, FIG. 2 discloses an illustrative embodiment of the present invention wherein 49 generally designates the thrust chamber of a rocket motor. The thrust chamber of the rocket motor has a combustion chamber 50 wherein fuel is ignited and burned to produce high pressure fluids which pass through the nozzle 51 of the rocket motor and which are caused to expand through the exit cone 52. Connected to the combustion chamber 50 is conduit 23, which provides for the ducting off of high pressure gases from the combustion chamber 50 and directs the high pressure gases through a nozzle 24. Attached to the nozzle 24 are two passages 27 and 28. Disposed between the nozzle 24 and the passages 27 and 28 are reliefs in the walls at 25. These reliefs effect a sharp increase in cross-sectional area of the nozzle exit between the nozzle 24 and the passages 27 and 28. As has been hereinbefore explained, this sharp increase in cross-sectional area provides a low pressure area 35 which acts in conjunction with the back pressure in the opposite passage to "lock on" the fluid flow into the adjacent passage. Encasements 37 are disposed at the reliefs in the walls of the nozzle exit and accommodate the tabs 33 which are slidably mounted in the encasements 37. The tabs 33 may be operably moved into the flow passage by any suitable actuation means 36 such as a hydraulic actuator, a solenoid, a rack and pinion drive mechanism, or any equivalent device.

The tabs 33 act in the same manner as a secondary fluid which is utilized to control the device illustrated in FIG. 1. For instance, if the fluid flow is passing from nozzle 24 through passage 27, remaining there due to the differential pressure between area 35 and the back pressure in channel 28, it can be forced into channel 28 by tab 33. The actuation means 36 moves tab 33 which interrupts the fluid flow and thereby disturbs the low pressure area and creates an oblique shock wave which forces the fluid flow to channel 28. The fluid flow then locks onto channel 28 and will not revert to channel 27 unless the tab 33' is injected into the passageway so as to interrupt the flow.

The use of the tabs instead of utilizing a secondary fluid injection to control the main fluid flow provides a more direct control of the fluid flow. It has been found that when tab 33 is injected into the fluid flow, it gradually reduces the flow in the passage associated therewith and as the tab is moved into the fluid flow path a gradual increase of fluid flow occurs in the opposite channel. This increase remains relatively constant to a fixed point along the line of travel of the tab at which the entire flow rapidly moves to the opposite channel and "locks on" at which time the tab may be retracted. This phenomena is very beneficial in that the relative amount of fluid flow in the respective channels can be controlled. The tabs, therefore, provide somewhat of an analogue function whereas the injection of a secondary fluid to control the main fluid flow provides a digital type function because as the fluid is injected into the main fluid flow it is carried along with the main fluid flow until a sufficient amount is injected to force the main fluid flow into the opposite channel.

In the operation of the device of FIG. 2, the fuel or propellant of the rocket motor is burned in chamber 50 to provide an exhaust through the exit cone 52. By way of conduit 23, combustion gases under high pressure are ducted and passed through nozzle 24 which exits into a junction of a Y type configuration comprising channels 27 and 28. Channel 28 exhausts through passage 31 to the atmosphere after it has intersected channel 27 at the intersection 29. The other leg of the Y, 27, makes a turn and intersects leg 28 at an intersection 29 and terminates at 32 in the side wall of the exit cone 52. If no directional control of the rocket motor is desired, the flow of fluid is passed through channel 28 through intersection 29 and exhausted at the exit 31 of channel 28 to the atmosphere. If, however, it is desired to control the thrust vector by interrupting the exhaust flow from the rocket motor by injecting a secondary flow of gas at the termination 32, the fluid flow is gradually moved from passage 28 to passage 27 by the movement of the tab 33' into the fluid flow path as it flows through the passage 28. At a given point, depending upon the configuration of the nozzle 24 and its expansion ratio, all of the fluid flow is sharply moved and "locked on" to channel 27. Fluid flow then passes through passage 27, through the intersection 29 and impinges the main high pressure fluid flow from the rocket motor.

As is apparent from FIG. 2, a plurality of such thrust vector control devices may be disposed at certain points on the circumference of the exhaust exit cone 52 to thereby effect varying degrees of thrust vector control from various angles and thereby to provide various degrees of steering of the missile which the rocket motor propels.

Figure 3:
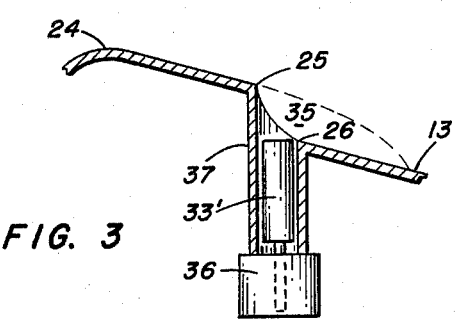
FIG. 3 is an enlarged cross-sectional view of one-half of the midsection of the embodiment illustrated in FIG. 2.

FIG. 3 which is an enlarged cross-sectional view of the tab 33' area of FIG. 2 more clearly shows the relationship of the side walls of the nozzle 24 exit to form a step or relief between points 25 and 26 which in turn causes a low pressure area at 35.

As is apparent from the foregoing description, the present invention provides a thrust vector control system applicable to aerospace vehicles employing jet propulsion type motors which provides an effective thrust control with a minimum of moving parts and a minimum of weight.

While the invention has been described in its preferred embodiment, it is to be understood that the terminology used herein is intended to be in the nature of words of description rather than of words of limitation.

Obviously many modifications and variations of the present invention are possible in the light of the above teachings. It is therefore to be understood that within the scope of the appended claims the invention may be practiced otherwise than as specifically described.

What is claimed is:
1. A missile propulsion system comprising:
 a combustion chamber means for burning fuel to produce high pressure fluids;
 an expansion cone means with diverging side walls attached to said combustion chamber means for receiving said fluids therefrom;
 a fluid-carrying conduit means connected at the first end thereof to said combustion chamber;
 a nozzle disposed in the second end of said conduit means;
 first and second passages joined to the second end of said conduit means and forming a junction therewith at the exit of said nozzle;
 relief means on opposite sides of said junction for providing a sharp increase in the exit area of said nozzle;

first and second slidably mounted tab means disposed in juxtaposition to said respective relief means for insertion into the nozzle exit immediately adjacent the relieved portion thereof and into the fluid flow exiting from said nozzle;

actuation means operably connected to the first and second tab means respectively for moving said respective tab means into said nozzle at the exit thereof;

said first and second passages being disposed so as to lead away from said junction in independent directions and then to change their directions so as to pass through a common intersection at a point remote from said junction;

said first passage terminating at a point downstream from said intersection;

said second passage terminating downstream from said intersection at a connection with said exit cone; whereby fluid passing through said conduit and said first passage will be diverted into said second passage, by insertion of said tab means on the first passage side of said junction into the flow of fluid, and will remain flowing through said second passage to interrupt the exhaust jet in said exit cone, and thereby effect the direction of thrust vector thereof, up retraction of said first tab means, and further whereby the fluid flow will be reverted back to said first passage and thereby be exhausted to atmosphere upon insertion of the second tab means on said second passage side of said junction into the fluid flow.

2. A missile propulsion system comprising:

a combustion chamber means for burning fuel to produce high pressure fluids;

an expansion means attached to said combustion chamber means for passing said fluids from said combustion chamber means to atmosphere;

a fluid conduit means connected by the first end thereof for receiving fluid from said combustion chamber means;

a nozzle disposed in the second end of said conduit means;

first and second passages joined to the second end of said conduit means;

a junction formed by a joining of said first and second passages and the second end of said conduit means at the exit of said nozzle;

relief means in opposite sides of said junction for providing a sharp increase in the exit area of said nozzle;

first and second slidably mounted tab means disposed in juxtaposition to said respective relief means for insertion into the nozzle exit immediately adjacent the relieved portion thereof and into the fluid flow exiting from said nozzle;

actuation means operably connected to said first and second tab means respectively for moving said respective tab means into said nozzle at the exit thereof;

first and second passages mutually diverging from said junction;

said second passage being so disposed that the flow path thereof intersects and passes through the flow path of said first passage at a point appreciably remote from said junction;

means intermediate said second passage and said expansion means for providing impingement of the jet flow through said expansion means by the flow of fluid from said second passage downstream from said intersection;

an exhaust means on said first passage downstream of said intersection for passing the fluid flowing therethrough to atmosphere.

3. A fluid amplifier apparatus comprising:

a fluid-carrying conduit connected by the first end thereof to a high-pressure fluid supply means;

a nozzle disposed in the second end of said conduit, first and second passages joined to said conduit at a junction with said second end of said conduit;

said first and second passages disposed so as to lead away from said nozzle in respectively independent directions and then to subsequently change directions so as to intersect at a common point remote from said junction;

said first and second passages continuing past the point of intersection;

first and second tab means slidably mounted on opposite sides of said junction for insertion into the exit of said nozzle and into the fluid flow exiting from said nozzle;

actuation means attached to said first and second tab means for slidably moving said first and second tab means respectively into the nozzle exit.

4. In a jet propulsion device wherein high pressure fluid is propagated and exhausted therefrom to produce thrust, the improvement comprising at least one:

bypass conduit attached to the high pressure fluid propagation section of said device;

a nozzle disposed within said bypass conduit;

a step means in said bypass conduit immediately adjacent the exit from said nozzle for providing a sharp increase in the cross-sectional area of said bypass conduit;

tab means slidably mounted adjacent said step means for movement from opposite sides of said conduit into the fluid flow exiting from said nozzle;

actuation means attached to said tab means for slidably moving said tab means, first and second passages attached to said nozzle exit at said step means for receiving the fluid flow from said nozzle;

said first and second passages being so disposed as to diverge from said nozzle exit for predetermined distances in mutually independent downstream directions, thence being so disposed as to intersect at a point appreciably remote from said nozzle exit;

said first passage being further disposed to discharge to the atmosphere at a location which is downstream from said intersection;

said second passage being so disposed as to direct fluid flowing therefrom in a manner to impinge upon the exhaust of the jet propulsion device.

5. Apparatus for steering a rocket motor which has a combustion chamber for burning fuel to form high pressure gases and an exit cone attached to said combustion chamber with diverging side walls, said apparatus comprising:

a fluid-carrying conduit having one end in fluid communication with said combustion chamber, a nozzle disposed in the second end of said conduit, first and second passages leading away from said nozzle whereby a Y is formed by the conduit and the first and second passages, a relief means disposed in each side wall of the exit of said nozzle for providing a sharp increase in cross-sectional area at a point between said nozzle and the first and second passages whereby fluid passing from said nozzle is subjected to a pressure drop as it passes the relief associated with one of either said first passage or said second passage and thereby continues to flow past said relief due to the pressure differential between the relief side of said flow and the side of said flow exposed to the back pressure in the opposite one respectively of said passages, first and second tab means normally disposed adjacent the respective relief means, said first and second tab means being slidably mounted for mutually juxtaposed movement into and out of their respective side walls at the exit of said nozzle and into and out of the fluid flow exiting from said nozzle, actuating means associated with said first and second tabs for inserting the respective tabs into the fluid flow stream passing through one of said first passage and second passage whereby the flow of fluid in one of said first passage and second passage is interrupted to thereby destroy the differential pressure and to effect the forcing of flow into the opposite one respectively of said first passage and said second passage, said first and second passages being disposed in a manner whereby initially they diverge from the junction with the nozzle, then converge and lead to a common intersection thereby providing a back pressure in a respective one of said first and second passages due to fluid flow in the respective opposite one of said first and second passages, said first passage terminating in an outlet exiting to ambient pressure after said intersection, and said second passage being terminated downstream from said intersection by an outlet exiting through the wall of said exit cone of said rocket motor to provide an inlet thereto whereby the flow of high pressure fluid from the rocket motor will be disturbed in a predetermined manner thereby causing jet deflection to effect a steering capability.

6. In a missile propulsion system as claimed in claim 4 having:

more than one combustion chamber means and expansion means combinations, and with more than one bypass means and passage means combination associated with each combustion chamber means and expansion means combination.

References Cited by the Examiner
UNITED STATES PATENTS

| | | | |
|---|---|---|---|
| 2,694,898 | 11/1954 | Stauff | 60—35.54 |
| 3,001,539 | 9/1961 | Hurvitz. | |
| 3,036,430 | 5/1962 | Eggers et al. | 60—35.54 |
| 3,066,485 | 12/1962 | Bertin et al. | 60—35.54 |
| 3,091,393 | 5/1963 | Sparrow | 137—83 |
| 3,132,478 | 5/1964 | Thielman | 60—35.54 |
| 3,135,291 | 6/1964 | Kepler et al. | 60—35.54 |
| 3,144,037 | 8/1964 | Cargill et al. | 137—81.5 |

MARK NEWMAN, *Primary Examiner.*

SAMUEL FEINBERG, BENJAMIN A. BORCHELT,
*Examiners.*

G. L. PETERSON, G. H. GLANZMAN, *Assistant Examiners.*